United States Patent
Bachl et al.

(10) Patent No.: US 7,733,988 B2
(45) Date of Patent: Jun. 8, 2010

(54) MULTIFRAME CONTROL CHANNEL DETECTION FOR ENHANCED DEDICATED CHANNEL

(75) Inventors: Rainer Bachl, Nuremberg (DE); Francis Dominique, Rockaway, NJ (US); Hongwei Kong, Denville, NJ (US); Walid E. Nabhane, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 831 days.

(21) Appl. No.: 11/260,319

(22) Filed: Oct. 28, 2005

(65) Prior Publication Data
US 2007/0098115 A1 May 3, 2007

(51) Int. Cl.
*H04L 27/06* (2006.01)
(52) U.S. Cl. ............... 375/340; 375/343; 375/341; 704/223; 704/241; 714/780; 714/795; 455/67.11
(58) Field of Classification Search ............... 370/329, 370/335; 375/340; 714/780, 795
See application file for complete search history.

(56) References Cited

U.S. PATENT DOCUMENTS 5,398,254 A * 3/1995 Miya et al. ............... 714/795
6,215,831 B1 * 4/2001 Nowack et al. ............ 375/340
6,965,586 B1 * 11/2005 Maruyama ................. 370/335
7,127,663 B2 * 10/2006 Mohseni et al. ............ 714/780
2002/0172217 A1 11/2002 Kadaba et al.
2003/0117979 A1 6/2003 Chitrapu
2007/0036104 A1 * 2/2007 Bachl et al. ............... 370/329

FOREIGN PATENT DOCUMENTS

| EP | 1-594-247 A2 | 11/2005 |
|---|---|---|
| JP | 2001-145151 | 5/2001 |
| WO | WO 98/27684 | 6/1998 |
| WO | WO 2005/032192 | 4/2005 |

OTHER PUBLICATIONS

International Search Report and Written Opinion dated May 3, 2007.
International Preliminary Report dated Oct. 12, 2007.

\* cited by examiner

*Primary Examiner*—Sudhanshu C Pathak
(74) *Attorney, Agent, or Firm*—Harness, Dickey & Pierce

(57) ABSTRACT

A plurality of decoding metrics for a current frame may be generated based on a correlation set for a current frame and a correlation set for at least one previous frame. Whether a signal is present on a control channel may then be determined based on the generated decoding metrics.

23 Claims, 7 Drawing Sheets

FIG. 7

FOR MULTI-FRAME N,1

$$(CORR\_N_1, CORR\_N_2, ..., CORR\_N_K) + (CORR\_N-1_1, CORR\_N-1_2, ..., CORR\_N-1_K) =$$

$$(CORR\_N_1 + CORR\_N-1_1), (CORR\_N_2 + CORR\_N-1_2), ..., (CORR\_N_K + CORR\_N-1_K)$$

$$\Downarrow \qquad\qquad \Downarrow \qquad\qquad \Downarrow$$

$$CORR\_N,1_1, \qquad CORR\_N,1_2 \quad ..., \quad CORR\_N,1_K$$

RESULTANT MULTIFRAME CORRELATION SET FOR FRAMES N AND N-1

NOISE ENERGY $NE_{N,1}$ $$NE_N + NE_{N-1} = NE_{N,1}$$

MULTIFRAME CONTROL CHANNEL DETECTION FOR ENHANCED DEDICATED CHANNEL

CROSS-REFERENCE TO RELATED APPLICATIONS

This application is related to co-pending U.S. patent application Ser. No: Ser. No. 11/201,364 filed Aug. 11, 2005 to Bachl et al. and entitled "DEDICATED CONTROL CHANNEL DETECTION FOR ENHANCED DEDICATED CHANNEL." The entire contents of this co-pending U.S. patent application are incorporated herein by reference.

BACKGROUND OF THE INVENTION

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), hereinafter referred to as a user, and a base station (BS) or NodeB). The dedicated channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control sub-channel in accordance with CDMA2000 protocols, etc.).

Newer versions of these standards, for example, Release 6 of UMTS provide for high data rate uplink channels referred to as enhanced dedicated channels (E-DCHs). An E-DCH may include an enhanced data part (e.g., an E-DCH dedicated physical data channel (E-DPDCH) in accordance with UMTS protocols) and an enhanced control part (e.g., an E-DCH dedicated physical control channel (E-DPCCH) in accordance with UMTS protocols).

FIG. 1 illustrates a conventional wireless communication system 100 operating in accordance with UMTS protocols. Referring to FIG. 1, the wireless communication system 100 may include a number of NodeBs such as NodeBs 120, 122 and 124, each serving the communication needs of a first type of user 110 and a second type of user 105 in their respective coverage area. The first type of user 110 may be a higher data rate user such as a UMTS Release 6 user, referred to hereinafter as an enhanced user. The second type of user may be a lower data rate user such as a UMTS Release 4/5 user, referred to hereinafter as a legacy user. The NodeBs are connected to an RNC such as RNCs 130 and 132, and the RNCs are connected to a MSC/SGSN 140. The RNC handles certain call and data handling functions, such as, autonomously managing handovers without involving MSCs and SGSNs. The MSC/SGSN 140 handles routing calls and/or data to other elements (e.g., RNCs 130/132 and NodeBs 120/122/124) in the network or to an external network. Further illustrated in FIG. 1 are interfaces Uu, Iub, Iur and Iu between these elements.

An example of a frame structure for the E-DCHs (e.g., E-DPCCH and E-DPDCH) in the uplink direction is illustrated in FIG. 2. Each frame 200 may have a length of, for example, 10 milliseconds (ms) and may be partitioned into 5 sub-frames each including 3 slots. Each slot 205 may have a length of, for example, 2560 chips, and may have a duration of, for example, 2/3 ms. Consequently, each sub-frame may have a duration of 2 ms.

As discussed above, an E-DCH includes an E-DPDCH 240 and an E-DPCCH 220, and each of the E-DPCCH 220 and the E-DPDCH 240 may be code multiplexed.

The E-DPCCH 220 carries control information for an associated E-DPDCH 240. This control information includes three components: a re-transmission sequence number (RSN), a transport format indicator (TFI) and a happy bit. The RSN indicates the transmission index of an associated packet transmitted on the E-DPDCH. That is, the RSN value indicates the number of times data associated with an upper layer enhanced dedicated transport channel (E-DTrCH), and associated control information has been transmitted by a UE without receiving an acknowledgment (ACK) from the NodeB in return. Currently in UMTS Release 6, the RSN has a maximum value of 3 and is represented by two bits.

The TFI indicates the data format for the transport channel carried by the associated E-DPDCH (e.g., transport block size, transmission time interval (TTI), etc.) and is represented by 7 bits. The TFI value may be a value selected from a transport format set (TFS) including all possible TFI values for a given transmission.

The happy bit is a binary indicator, which may be used by a UE to inform one or more NodeBs whether the UE is satisfied with the current setup of the E-DCH channels and is represented by a single bit. For example, UE 110 of FIG. 1 may use this indicator to inform one of the NodeBs 120/122/124 that the UE 110 can handle greater data capacity. In other words, the happy bit is a rate increase request bit.

FIG. 3 illustrates a conventional UMTS uplink transmitter 300 located at the enhanced UE 110 of FIG. 1 and a receiver 350 located at one of the NodeBs 120/122/124. The conventional transmitter 300 and receiver 350 of FIG. 3 may transmit and receive E-DCHs.

As shown in FIG. 3, data associated with an upper layer enhanced dedicated transport channel (E-DTrCH) may be processed into E-DPDCH frames at the transmission channel processing block 303. The frames may be binary phase shift keying (BPSK) modulated and orthogonally spread at the modulation and orthogonal spreading unit 304. The spread modulated frames are received by the gain unit 315 where an amplitude of the spread modulated frames may be adjusted. A combiner 320 receives the output of the gain unit 315.

Still referring to FIG. 3, the 2 RSN bits, the 7 TFI bits and the 1 happy bit are mapped into a 10-bit E-DPCCH word, which may be control information for an associated E-DPDCH frame having a TTI of, for example, 2 ms or 10 ms.

The 10-bit E-DPCCH word includes a happy bit set to a given value (e.g., '1' or '0'), a format indicator or TFI having a value corresponding to a data format for the transport channel carried by the associated E-DPDCH frame (e.g., transport block size, transmission time interval (TTI), etc.), and an RSN value between 0 and 3. The happy bit and the TFI may be referred to as control data.

The 10-bit E-DPCCH word may then be coded into a 30-bit coded sequence at an FEC unit 301. That is, for example, the 10-bit E-DPCCH word associated with a single E-DPDCH frame is first coded into a 32-bit E-DPCCH codeword using a (32, 10) sub-code of the second order Reed-Muller code. The 32-bit codeword is then punctured to (30, 10) code to generate the 30 coded symbols (in this case 1 bit will represent 1 symbol) to be transmitted. These 30 coded symbols are transmitted in one sub-frame; for example, 3 slots 200 as shown in FIG. 2 with 10-bits per slot.

Returning to FIG. 3, the 30-bit coded sequence is modulated at a BPSK Modulator 305 and orthogonally spread at an orthogonal spreading unit 310. The output from the orthogonal spreading unit 310 is gain adjusted at a gain unit 316 and output to the combiner 320.

Similar to the above E-DPCCH, well-known DPCCH frames used in determining, for example, channel estimates, are modulated at a BPSK Modulator 306, and the modulated frames are orthogonally spread at an orthogonal spreading unit 311. The spread modulated frames are received by a gain unit 317 where an amplitude of the spread modulated frames may be adjusted.

The outputs of each of the gain units 315, 316 and 317 are complex signals and are combined (e.g., code-division and/or I/Q multiplexed) into a combined signal by a combiner unit 320. The combined signal is scrambled and filtered by a shaping filter 325, and the output of the shaping filter 325 is sent to the receiver 350 via a propagation channel 330 (e.g., over the air).

After the transmitter 300 transmits the combined signal over the propagation channel 330, the transmitting UE awaits an ACK from the NodeB indicating that the transmitted signal has been successfully received and decoded.

If an ACK is received by the user, the transmitter 300 may transmit new E-DTrCH data. If an ACK is not received or an NACK is received, the UE may retransmit data from the same E-DTrCH and similar control information via an E-DPDCH frame and corresponding E-DPCCH frame, respectively.

The retransmitted E-DPCCH frame includes the same or different happy bit value, the same TFI value, and an incremented RSN value. For example, if the RSN value of the initial frame is N, the RSN value of the retransmitted frame is N+1. Thus, RSN values for consecutive retransmissions of the same data are correlated in that the values are incremented by one.

After retransmitting the data and associated control information (e.g., via an E-DPDCH frame and a corresponding E-DPCCH frame, respectively) including an RSN value of N+1, if still no ACK is received from the NodeB or a NACK is received, the UE may retransmit the data and similar control information again via another E-DPDCH frame and E-DPCCH frame, respectively. In this retransmission (e.g., third transmission), the E-DPCCH frame may have an RSN value of N+2. The UE may continue to retransmit the non-acknowledged data until an ACK is received, or the number of retransmissions reaches a threshold value.

At the receiver 350, the transmitted signal is received over the propagation channel 330, and input to the E-DPDCH processing block 335, E-DPCCH soft-symbol generation block 345 and a DPCCH channel estimation block 355. As is well-known in the art, the DPCCH channel estimation block 355 generates channel estimates using pilots transmitted on the DPCCH. The channel estimates may be generated in any well-known manner, and will not be discussed further herein for the sake of brevity. The channel estimates generated in the DPCCH channel estimation block 355 may be output to each of the E-DPDCH processing block 335 and the E-DPCCH soft-symbol generation block 345.

At the soft-symbol generation block 345, the received control signal may be de-scrambled, de-spread, and de-rotated/ de-multiplexed to generate a sequence of soft-symbols. The E-DPCCH soft-symbols may represent an estimate of the received signal, or in other words, an estimate of the 30 symbols transmitted by the transmitter 300. The E-DPCCH soft-symbols may be further processed to recover the transmitted E-DPCCH word.

The E-DPCCH soft-symbols are output to an E-DPCCH discontinuous transmission (DTX) detection unit 365. The E-DPCCH DTX detection unit 365 determines whether the signal received on the E-DPCCH is actually present using a thresholding operation.

For example, the E-DPCCH DTX detection unit 365 may normalize a signal energy for a received E-DPCCH frame (e.g., the signal energy over a given TTI of 2 ms) and compare the normalized signal energy to a threshold. If the normalized signal energy is larger than the threshold, the E-DPCCH DTX detection unit 365 determines that a control signal is present on the E-DPCCH; otherwise, the E-DPCCH DTX detection unit 365 determines that a control signal is not present on the E-DPCCH and, subsequently, declares a discontinuous transmission.

If the E-DPCCH DTX detection unit 365 detects that a control signal is present on the E-DPCCH, the soft-symbols output from the soft-symbol generation block 345 are processed by the E-DPCCH decoding block 375 to recover (e.g., estimate) the 10-bit E-DPCCH word transmitted by the transmitter 300.

For example, in recovering the transmitted 10-bit E-DPCCH word, the E-DPCCH decoding block 375 may determine a correlation value or correlation distance, hereinafter referred to as a correlation, between the sequence of soft-symbols and each 30-bit codeword in a subset (e.g., 2, 4, 8, 16, 32, etc.) of all 1024 possible E-DPCCH codewords that may have been transmitted by the transmitter 300. This subset of codewords may be referred to as a codebook.

After determining a correlation between the sequence of soft-symbols and each of the codewords in the codebook, the E-DPCCH decoding block 375 selects the 10-bit E-DPCCH word corresponding to the 30-bit E-DPCCH codeword, which has the highest correlation to the E-DPCCH soft-symbols. The 10-bit E-DPCCH word is then output to the E-DPDCH processing block 335 for use in processing the E-DPDCH.

If the E-DPDCH is successfully received and decoded at the receiver 350, the NodeB transmits an ACK to the transmitting UE in the downlink; otherwise, the NodeB transmits a NACK (e.g., if the NodeB is a serving NodeB) or nothing (e.g., if the NodeB is a non-serving NodeB)

The conventional E-DPCCH processing as shown in FIG. 3 is used to generate E-DPCCH performance results and/or set conformance test requirements for Release 6 UMTS standards. However, in conventional single-frame E-DPCCH processing, a high transmit power of E-DPCCH is required to achieve satisfactory detection performance. Moreover, performance does not improve as the number of retransmissions increases.

The E-DPCCH is decoded based on a single frame at all times. This limits the performance for the E-DPDCH, and results in faster power consumption and/or higher interference to other users.

SUMMARY OF THE INVENTION

In an example embodiment of the present invention, decoding metrics for a current frame of a control channel may be generated based on a correlation set for the current frame and a correlation set for at least one previous frame of the control channel. Whether a signal is present on the control channel may be detected based on the generated decoding metrics.

In another example embodiment of the present invention, whether a signal is present on a control channel may be detected based on a current frame of the control channel and at least one previous frame of the control channel. The current frame may be a retransmission of the control data in the at least one previous frame.

In example embodiments of the present invention, each correlation in the correlation set for the current frame and for the at least one previous frame may represent the likelihood that a respective codeword among a plurality of codewords is present in a signal received on the control channel.

In example embodiments of the present invention, the generating step may generate the decoding metrics for a current frame of a control channel based on the correlation set and a noise energy for the current frame and the correlation set and a noise energy for the at least one previous frame.

In example embodiments of the present invention, at least one multi-frame correlation set may be generated based on the correlation set for the at least one previous frame and the correlation set for the current frame. The decoding metrics may be generated based on the multi-frame correlation set.

In example embodiments of the present invention, the at least one multi-frame correlation set may be generated by combining each correlation in the correlation set for the current frame with a corresponding correlation in the correlation set for the at least one previous frame.

In example embodiments of the present invention, a correlation in the correlation set for the current frame may be selected as a current frame decoding metric. A correlation in the at least one multi-frame correlation set may be selected as at least one multi-frame decoding metric. The detecting step may detect whether a signal is present on the control channel based on at least one of the current frame decoding metric and the at least one multi-frame decoding metric. If the detecting step detects that a signal is present on the control channel, a control channel word may be output. The control channel word may be an enhanced control channel word.

In example embodiments of the present invention, a current frame energy metric may be calculated based on the current frame decoding metric, and at least one multi-frame energy metric may be calculated based on the at least one multi-frame decoding metric. Whether a signal is present may be detected based on a threshold and at least one of the current frame energy metric and the at least one multi-frame energy metric.

In example embodiments of the present invention, a highest correlation in the correlation set for the current frame may be squared to generate a current frame energy value, and the current frame energy value to may be normalized to generate the current frame energy metric. The normalized current frame energy value may be generated based on the current frame energy value and a noise energy for a current frame.

In example embodiments of the present invention, a highest correlation in each of the at least one multi-frame correlation set may be squared to generate at least one multi-frame energy value. The at least one multi-frame energy value may be normalized to generate the at least one multi-frame energy metric. The at least one normalized multi-frame energy value may be generated based on the multi-frame energy value and noise energies for the at least one previous frame and the current frame.

In example embodiments of the present invention, a validity of the at least one multi-frame energy metric may be determined, and one of the current frame energy metric and the at least one multi-frame energy metric may be selected as a decision metric if the at least one multi-frame energy metric is valid. Whether a signal is present on the control channel may be detected based on the decision metric and a threshold.

In example embodiments of the present invention, if the at least one multi-frame energy metric is valid, the detecting step may detect whether a signal is present on the control channel based on the current frame energy metric and the at least one multi-frame energy metric.

In example embodiments of the present invention, the threshold may be dependent on a number of codewords in a plurality of codewords associated with the control channel, a transport format set size associated with the frames received on the control channel and/or a maximum number of transmissions for a transport channel packet.

In example embodiments of the present invention, a control channel signal is present on the control channel if the decision metric is greater than or equal to the threshold.

In example embodiments of the present invention, an indicator indicative of whether the control channel signal is present on the control channel may be generated based on the detecting step, and whether to process data received on a data channel associated with the control channel may be determined based on the generated indicator.

In example embodiments of the present invention, the physical channel may be an enhanced dedicated channel.

In example embodiments of the present invention, the control data may include at least one of a format indicator and a happy bit indicator.

In example embodiments of the present invention, whether a signal is present on the control channel may be detected based on a correlation set and a noise energy for the current frame and a correlation set and a noise energy for the at least one previous frame.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limiting of the present invention and wherein:

FIG. 7 illustrates an example technique for combining sets of correlations and noise energies for consecutive single frames to produce a first set of multi-frame correlations and a first multi-frame noise energy, according to an example embodiment of the present invention.

DETAILED DESCRIPTION OF EXAMPLE EMBODIMENTS

As discussed above with regard to FIG. 1, a multi-user environment may include at least a first type of user 110, which may be a higher data rate user such as a UMTS Release 6 user, referred to herein as an enhanced user, and a second type of user 105, which may be a lower data rate user such as a UMTS Release 4/5 user, referred to herein as a legacy user. The enhanced users 110 and the legacy users 105 transmit signals to a serving NodeB 120/122/124 simultaneously over E-DCHs (e.g., E-DPDCHs and E-DPCCH) and dedicated channels (e.g., DPDCHs and DPCCH), respectively. As discussed above, these enhanced and legacy dedicated physical channels may be transmitted over respective propagation channels, each of which may include multiple propagation paths.

Figure 1:
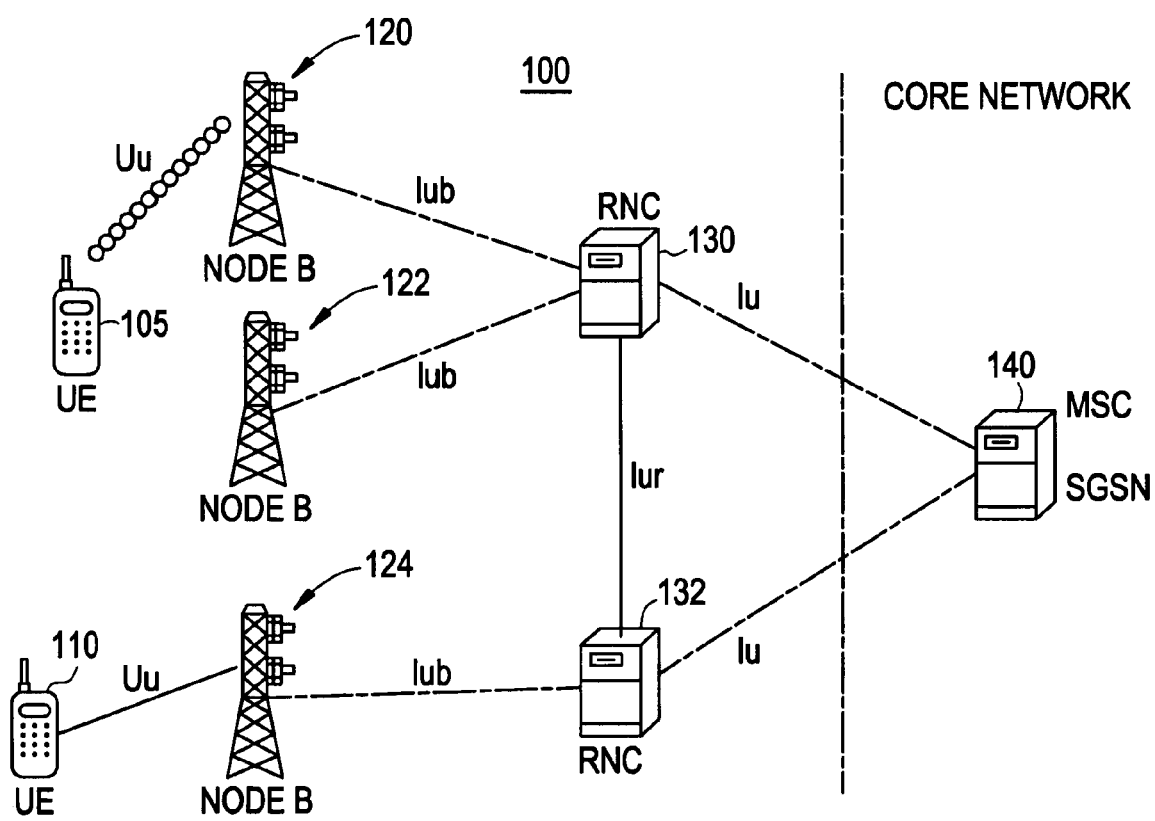
FIG. 1 illustrates a conventional wireless communication system operating in accordance with UMTS protocols.
Figure 2:
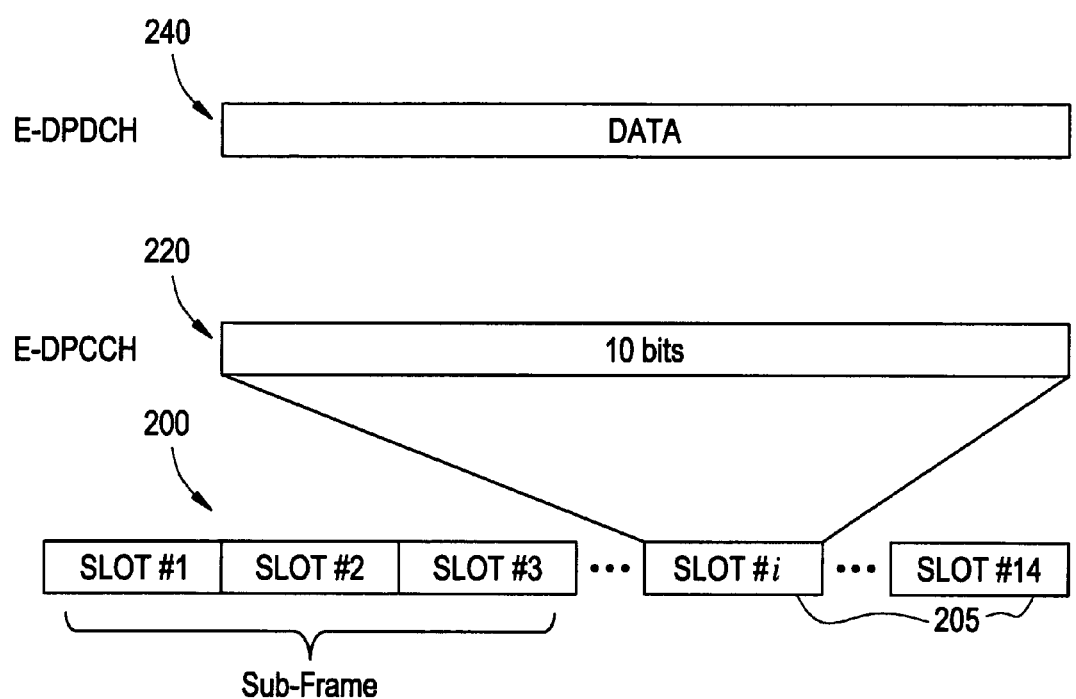
FIG. 2 illustrates an example of a conventional frame structure of enhanced uplink dedicated physical channels.
Figure 3:
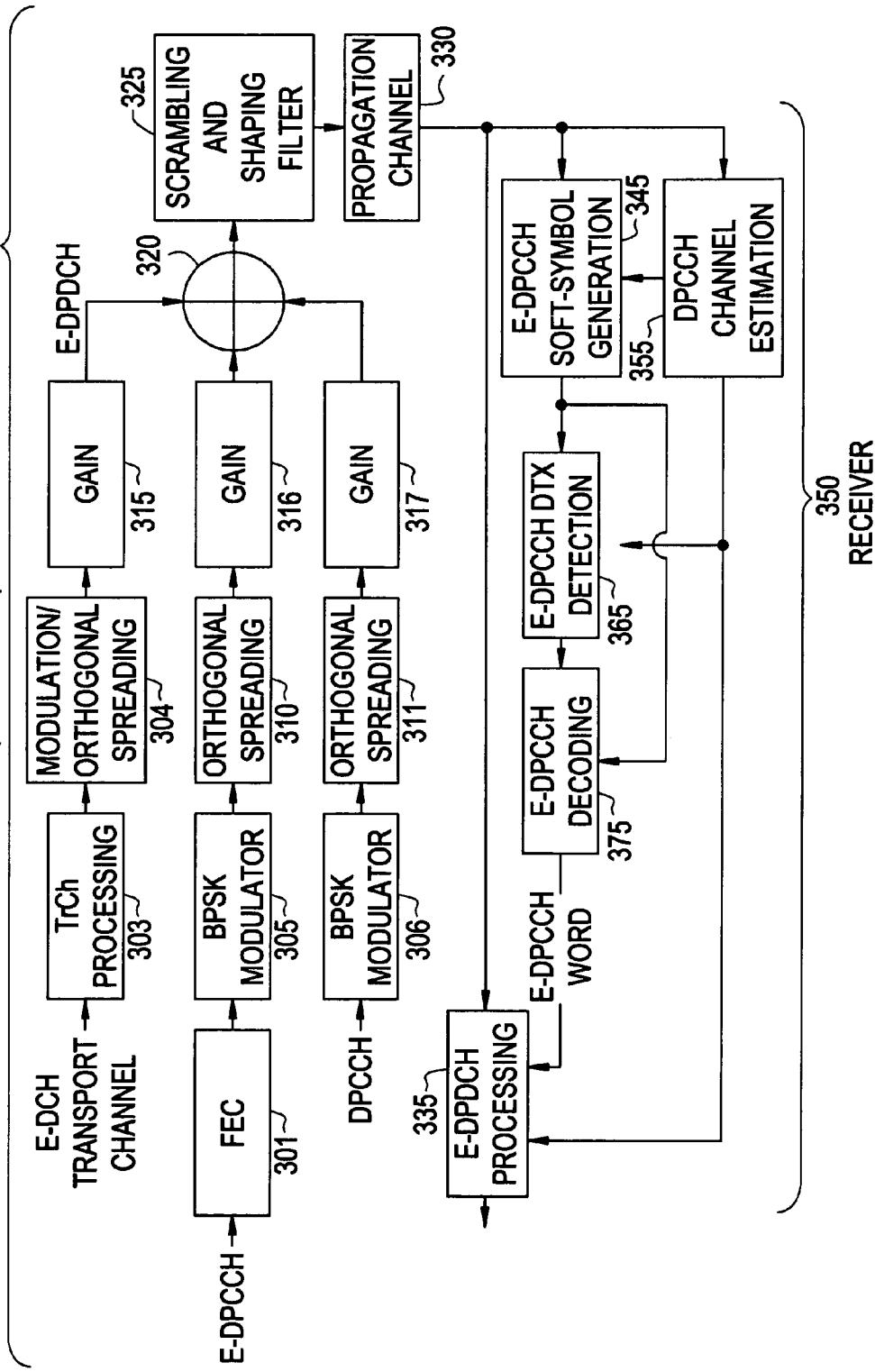
FIG. 3 illustrates a conventional UMTS uplink transmitter and receiver.
Figure 4:
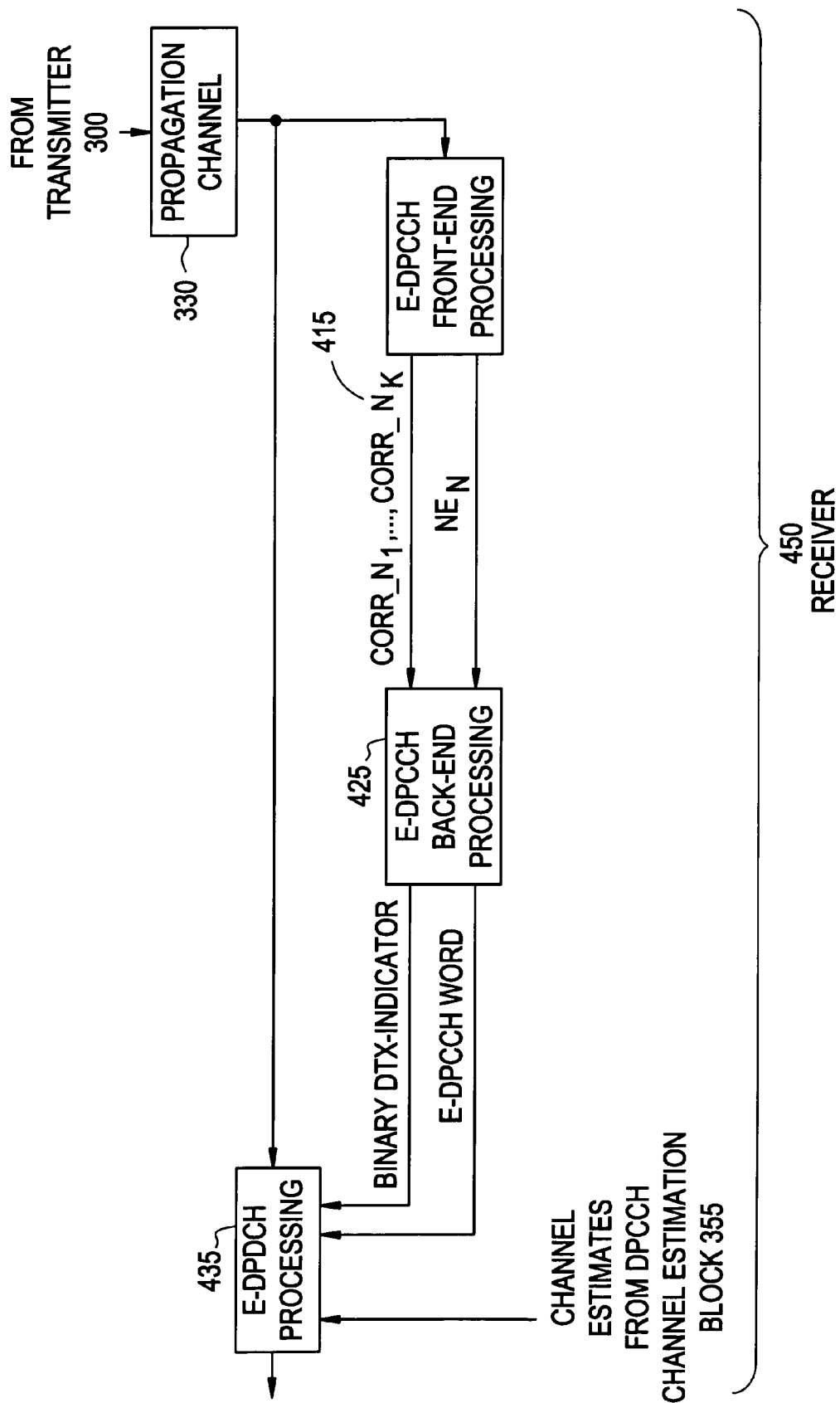
FIG. 4 illustrates a UMTS uplink receiver according to an example embodiment of the present invention.

FIG. 4 illustrates an uplink UMTS receiver 450, according to an example embodiment of the present invention. The receiver 450 may be located at, for example, any or all of the NodeBs 120/122/124 as shown in FIG. 1. For exemplary purposes example embodiments of the present invention will be discussed with regard to the conventional wireless system of FIG. 1; however, it will be understood that example embodiments of the present invention may be implemented in conjunction with any suitable wireless telecommunications network (e.g., UMTS, CDMA2000, etc.).

As shown in FIG. 4, a transmitted signal is received over the propagation channel 330. The received signal may be buffered until an entire current frame N of the signal is received. The current frame N may then be input to the E-DPDCH processing block 435 and E-DPCCH front-end processing block 415. The E-DPCCH front-end processing block 415 may generate a plurality of DPCCH channel estimates and a plurality of correlations for the current frame N.

Figure 5:
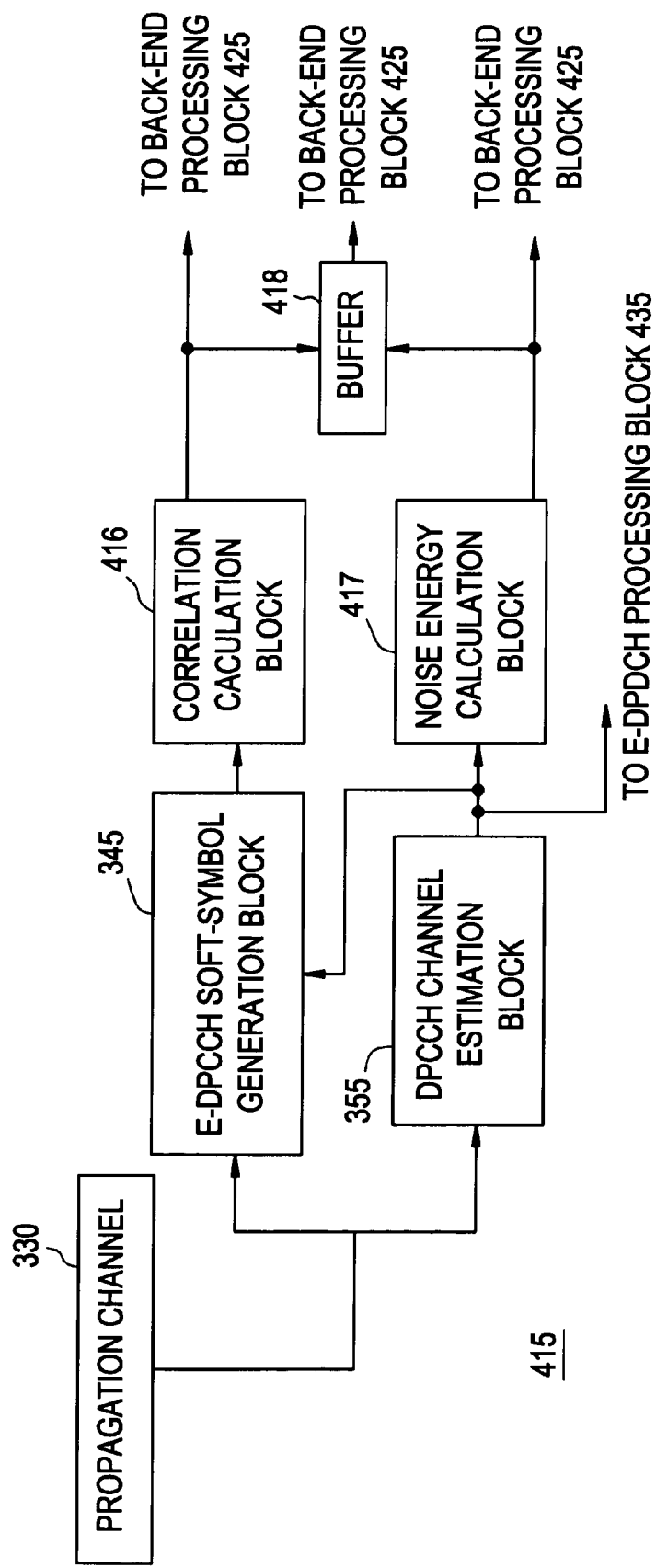
FIG. 5 illustrates a front-end processing block according to an example embodiment of the present invention.

FIG. 5 illustrates an E-DPCCH front-end processing block 415 according to an example embodiment of the present invention. As shown in FIG. 5, the current frame N may be input to an E-DPCCH soft-symbol generation block 345 and a DPCCH channel estimation block 355.

As is well-known in the art, the DPCCH channel estimation block 355 generates channel estimates using pilots transmitted on the DPCCH. The channel estimates may be generated in any well-known manner, and will not be discussed further herein for the sake of brevity. The channel estimates generated in the DPCCH channel estimation block 355 may be output to a noise energy calculation block 417, an E-DPDCH processing block 435 and the E-DPCCH soft-symbol generation block 345.

At the noise energy calculation block 417, the noise energy $NE_N$ for the current frame N may be estimated. The noise energy $NE_N$ may be calculated in any well-known manner. For example, DPCCH channel estimates for the current frame N, generated at the DPCCH channel estimation block 355, may be squared and added to produce a simple approximation of the noise energy $NE_N$ for the current frame N. This technique is well-known in the art.

The noise energy $NE_N$ may be output to the E-DPCCH back-end processing block 425 and stored in a buffer 418.

At the E-DPCCH soft-symbol generation block 345, the current frame N (e.g., control frame including a received control signal) may be de-scrambled, de-spread, and de-rotated/de-multiplexed to generate a sequence of soft-symbols. As discussed above, the E-DPCCH soft-symbols may represent an estimate of the received signal, or in other words, an estimate of the 30 symbols transmitted by the transmitter 300.

The soft-symbols output from the E-DPCCH soft-symbol generation block 345 may be received by the correlation calculation block 416. The correlation calculation block 416 may generate a correlation value or correlation distance (hereinafter referred to as a correlation) between the soft-symbols (e.g., the received signal over frame N) and each 30-bit codeword in a subset (e.g., 2, 4, 8, 16, 32, etc.) of all 1024 possible E-DPCCH codewords that may have been transmitted by the transmitter 300. This subset of codewords may be referred to as a codebook.

The size of the codebook, that is, the number of codewords in the codebook may correspond to the size of a transport format set (TFS). The TFS includes all possible TFIs. For example, the size of the codebook may be equal to the maximum TFI value, for example, 127. However, the codewords in the codebook may be determined in any suitable well-known manner and may be known by the UEs and NodeBs prior to transmission and reception.

Each correlation may represent a likelihood or probability that a respective 30-bit codeword has been transmitted by the transmitter 300. The plurality of correlations for the current frame N will be referred to herein as the first set of correlations.

Between successive transmissions of the same upper layer E-DTrCH data (herein after data), the happy bit and the TFI value (e.g., control data) may remain constant, whereas the RSN value may be incremented to indicate the number of times the data has been transmitted. For example, an RSN value of 0 indicates a first transmission of the data, an RSN value of 1 indicates a first retransmission (e.g., a second transmission) of the same data, and so on.

The data and corresponding control information may be retransmitted until an ACK is received from the NodeB or the number of retransmissions exceeds a transmission threshold.

Returning to FIG. 4, the first set of correlations ($CORR\_N_1$, $CORR\_N_2$, . . . , $CORR\_N_k$) and the noise energy $NE_N$ for the current frame N may be output to the E-DPCCH back-end processing block 425.

For example purposes, it is assumed that the maximum number of retransmissions of the same data is 4. Given a maximum of 4 retransmissions, possible RSN values for frame N are 0, 1, 2, and 3.

Figure 6:
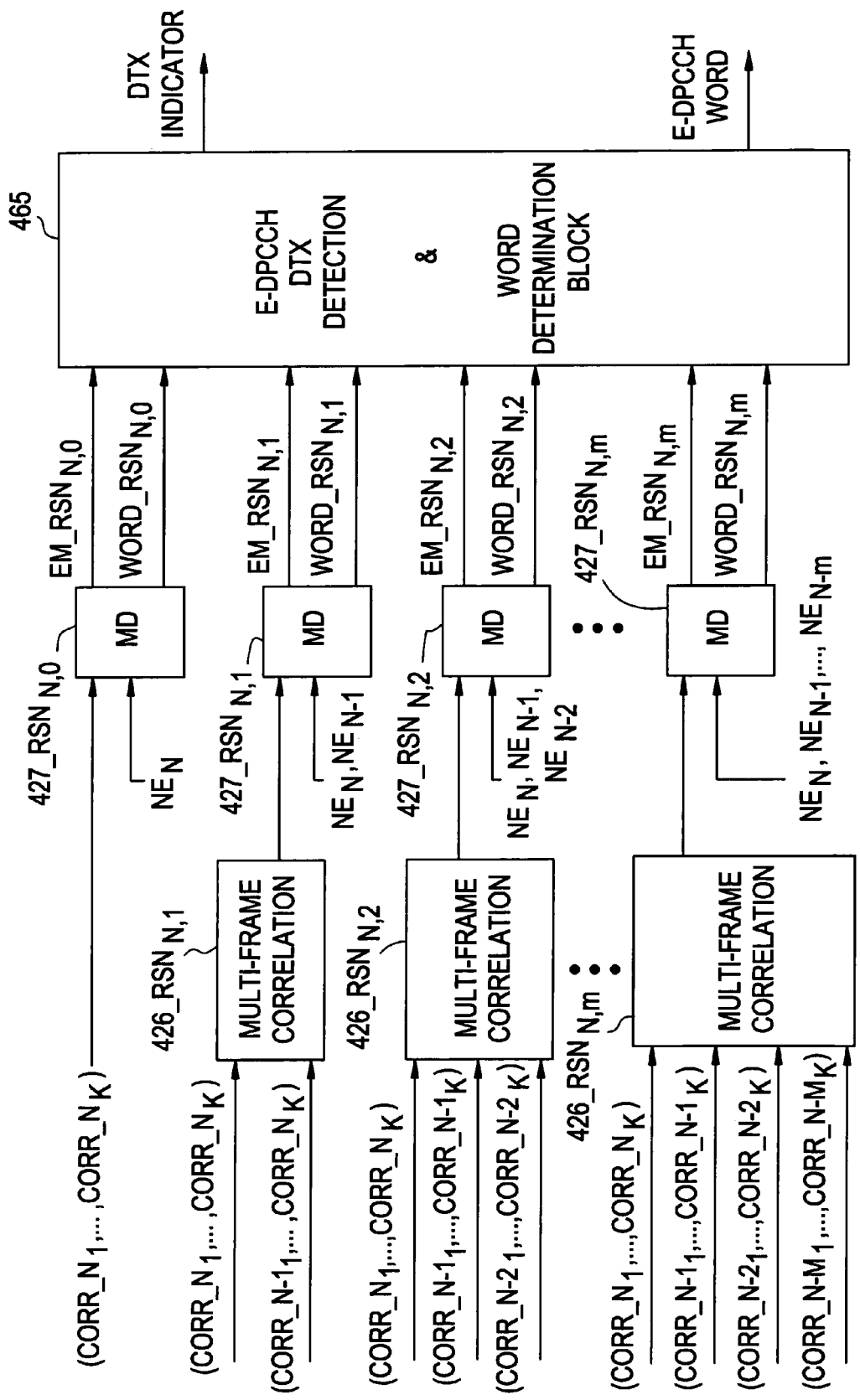
FIG. 6 illustrates a back-end processing block according to an example embodiment of the present invention.

FIG. 6 illustrates an E-DPCCH back-end processing block 425, according to an example embodiment of the present invention. As shown, frames N−1, N−2 and N−m represent consecutive control frames received on the E-DPCCH prior to frame N. For example purposes, we assume m=3 where m is the maximum number of permitted retransmissions. However m may be any suitable number. In processing data on a multi-frame basis according to example embodiments of the present invention, each frame N, N−1, N−2 and N−3 is assumed to include the same TFI data and happy bit data if they represent the same E-DTrCH data. In example embodiments of the present invention, N−3 is a frame received immediately prior to frame N−2, which was received immediately prior to frame N−1, which was received immediately prior to frame N.

In example embodiments of the present invention, a set of correlations and noise energy for each respective frame N−1, N−2 and N−3 may be buffered in the buffer 418. The buffer 418 may be any suitable buffer as is well-known in the art, and will not be discussed herein for the sake of brevity. Although the buffer 418 has been illustrated as part of the front-end processing block 415, it will be understood that the buffer 418 may be part of the back-end processing block 425 or a separate component of the receiver 450.

Referring to FIG. 6, the first set of correlations ($CORR\_N_1$, $CORR\_N_2$, . . . , $CORR\_N_k$) and the noise energy $NE_N$ for the current frame N may be input to a metric determination (MD) block 427_$RSN_{N,0}$ from the E-DPCCH front-end processing block 415. At the MD block 427_$RSN_{N,0}$, it is assumed that the current frame N has an RSN value of 0.

The MD block 427_$RSN_{N,0}$ may select the highest correlation $CORR\_N_{max}$ in the first set of correlations. The codeword in the codebook associated with the highest correlation $CORR\_N_{max}$ being a possible codeword transmitted by the transmitter 300. The highest correlation CORR_N$_{max}$ may be selected by comparing each correlation in the first set of correlations set with one another. This highest correlation CORR_N$_{max}$ may be used as a decoding metric DM_RSN$_{N,0}$.

After determining the highest correlation CORR_N$_{max}$ and associated codeword in the codebook, the MD block 427_RSN$_{N,0}$ may select the 10-bit word corresponding to the 30-bit codeword with the highest correlation for the current frame N. The selected 10-bit word may be referred to as WORD_RSN$_{N,0}$.

The MD block 427_RSN$_{N,0}$ may generate an energy metric EM_RSN$_{N,0}$ based on the decoding metric DM_RSN$_{N,0}$. For example, MD block 427_RSN$_{N,0}$ may square the decoding metric DM_RSN$_{N,0}$ to generate an energy value. The energy value may represent the signal energy for the E-DPCCH over the current frame N. The MD block 427_RSN$_{N,0}$ may then divide the signal energy for the current frame N by the calculated noise energy NE$_N$ (received from the E-DPCCH noise calculation block 417) to generate a signal-to-interference/noise ratio or a normalized energy value (SIR) for the current E-DPCCH frame N. This normalized energy or signal-to-noise ratio may be used as the energy metric EM_RSN$_{N,0}$. The energy metric EM_RSN$_{N,0}$ may be a possible energy metric for the current frame N with 0 previous frames considered.

The energy metric EM_RSN$_{N,0}$ and corresponding E-DPCCH word WORD_RSN$_{N,0}$ may be output to a DTX detection block 465.

Referring still to FIG. 6, at a multi-frame correlation block 426_RSN$_{N,1}$, it is assumed that the current frame N has an RSN value of 1. In this case, the first set of correlation and noise energy NE$_N$ for frame N, and a second set of correlation (CORR_N–1$_1$, CORR_N–1$_2$, . . . , CORR_N–1$_k$) and noise energy NE$_{N-1}$ for previous frame N–1 may be taken into account when determining a first multi-frame energy metric EM_RSN$_{N,1}$ and corresponding E-DPCCH word WORD_RSN$_{N,1}$. In this case, the first multi-frame energy metric EM_RSN$_{N,1}$ and the corresponding E-DPCCH word WORD_RSN$_{N,1}$ may represent a possible energy metric and corresponding E-DPPCH word for the current frame N considering the current frame N and 1 previous frame.

The multi-frame correlation block 426_RSN$_{N,1}$ may receive the first set of correlations and noise energy NE$_N$ from the E-DPCCH front-end processing block 415, and may retrieve the second set of correlations and noise energy NE$_{N-1}$ for the previous frame N–1 from the buffer 418.

The noise energies NE$_N$ and NE$_{N-1}$ may be added to produce a first multi-frame noise energy NE$_{N,1}$ for a first resultant multi-frame. The first resultant multi-frame may have a frame length twice the frame length of the current frame N. An example of this combining is shown in FIG. 7.

The multi-frame correlation block 426_RSN$_{N,1}$ may combine each correlation within the first set of correlations with a respective one of the correlations within the second set of correlations. That is, for example, each correlation in the first and second set corresponding to the same codeword may be added (CORR_N$_1$, CORR_N$_2$, . . . , CORR_N$_k$)+(CORR_N–1$_1$, CORR_N–1$_2$, . . . , CORR_N–1$_k$) to produce a set of first multi-frame correlations (CORR_N,1$_1$, CORR_N,1$_2$, . . . , CORR_N,1$_k$). An example of this combining is also shown in FIG. 7. The set of first multi-frame correlations may be output to a MD block 427_RSN$_{N,1}$.

The MD block 427_RSN$_{N+1}$ may select the highest multi-frame correlation CORR_N,1$_{max}$ in the set of first multi-frame correlations. The codeword in the codebook associated with the highest multi-frame correlation CORR_N,1$_{max}$ being a possible codeword transmitted by the transmitter 300.

The highest multi-frame correlation CORR_N,1$_{max}$ may be selected by comparing the multi-frame correlations in the set of first multi-frame correlations with one another. This highest multi-frame correlation CORR_N,1$_{max}$ may be used as a first multi-frame decoding metric DM_RSN$_{N,1}$.

After determining the highest multi-frame correlation CORR_N,1$_{max}$ and associated codeword in the codebook, the MD block 427_RSN$_{N,1}$ may select the 10-bit word corresponding to the 30-bit codeword with the highest multi-frame correlation. The 10-bit word may be referred to as WORD_RSN$_{N,1}$.

The MD block 427_RSN$_{N,1}$ may then generate a first multi-frame energy metric EM_RSN$_{N,1}$ based on the decoding metric DM_RSN$_{N,1}$. For example, MD block 427_RSN$_{N,1}$ may square the decoding metric DM_RSN$_{N,1}$ to generate an energy value. The energy value may represent the signal energy for the E-DPCCH over the first resultant multi-frame (e.g., frame N and N–1). The MD block 427_RSN$_{N,1}$ may then divide the signal energy for the first resultant multi-frame by the first multi-frame noise energy NE$_{N,1}$ to generate a signal-to-interference/noise ratio or normalized energy value (SIR) for the first resultant multi-frame. This normalized energy or signal-to-noise ratio may be used as the first multi-frame energy metric EM_RSN$_{N,1}$.

The first multi-frame energy metric EM_RSN$_{N,1}$ and associated word WORD_RSN$_{N,1}$ may be output to the DTX detection block 465.

Referring still to FIG. 6, at multi-frame correlation block 426_RSN$_{N,2}$ it is assumed that the current frame N has an RSN value of 2. In this case, a set of correlations and a noise energy for each of the current frame N, previous frame N–1 and previous frame N–2 may be taken into account when determining a second multi-frame energy metric EM_RSN$_{N,2}$ and corresponding E-DPCCH word WORD_RSN$_{N,2}$. In this case, the second multi-frame energy metric EM_RSN$_{N,2}$ and the corresponding E-DPCCH word WORD_RSN$_{N,2}$ may represent a possible energy metric and corresponding E-DPPCH word for the current frame N considering the current frame N and 2 previous frames.

A multi-frame correlation block 426_RSN$_{N,2}$ may receive the first set of correlations and noise energy NE$_N$ from the E-DPCCH front-end processing block 415. The multi-frame correlation block 426_RSN$_{N,2}$ may retrieve the second set of correlations and noise energy NE$_{N-1}$ for the previous frame N–1 and a third set of correlations (CORR_N–2$_1$, CORR_N–2$_2$, . . . , CORR_N–2$_k$) and a noise energy NE$_{N-2}$ for the previous frame N–2 from the buffer 418.

The noise energies NE$_N$, NE$_{N-1}$, and NE$_{N-2}$ for frames N, N–1 and N–2, respectively, may be combined, in a manner similar to that shown in FIG. 7, to produce a second multi-frame noise energy NE$_{N,2}$ for a second resultant multi-frame frame (e.g., including frame N, N–1 and N–2). However, in this case, three noise energies may be added. Here, the second resultant multi-frame may have a frame length three times that of the current frame N.

The multi-frame correlation block 426_RSN$_{N,2}$ may combine each correlation in the first set with corresponding correlations in each of the second and third sets. That is, for example, each correlation in the first, second and third sets of correlations corresponding to the same codeword may be added to produce a set of second multi-frame correlations (CORR_N,2$_1$, CORR_N,2$_2$, . . . , CORR_N,2$_k$). This combining may be similar to that which is shown in FIG. 7, except that three sets of correlations may be combined. The set of second multi-frame correlations may be output to an MD block 427_RSN$_{N,2}$.

The MD block $427\_RSN_{N,2}$ may select the highest multi-frame correlation $CORR\_N,2_{max}$ in the set of second multi-frame correlations. The codeword in the codebook associated with the highest multi-frame correlation $CORR\_N,2_{max}$ being a possible codeword transmitted by the transmitter 300. The highest multi-frame correlation $CORR\_N,2_{max}$ may be selected by comparing the multi-frame correlations in the set of second multi-frame correlations with one another. This highest multi-frame correlation $CORR\_N,2_{max}$ may be used as a second multi-frame decoding metric $DM\_RSN_{N,2}$.

After determining the highest multi-frame correlation $CORR\_N,2_{max}$ and associated codeword in the codebook, the MD block $427\_RSN_{N,2}$ may select the 10-bit word corresponding to the 30-bit codeword with the highest multi-frame correlation. The selected 10-bit word may be referred to as $WORD\_RSN_{N,2}$.

The MD block $427\_RSN_{N,2}$ may then generate an second multi-frame energy metric $EM\_RSN_{N,2}$ based on the second multi-frame decoding metric $DM\_RSN_{N,2}$. For example, MD block $427\_RSN_{N,2}$ may square the second multi-frame decoding metric $DM\_RSN_{N,2}$ to generate an energy value. The energy value may represent the signal energy for the E-DPCCH over the second resultant multi-frame (e.g., including frames N, N−1 and N−2).

The MD block $427\_RSN_{N,2}$ may then divide the signal energy for the second resultant multi-frame by the second multi-frame noise energy $NE_{N,2}$ to generate a signal-to-interference/noise ratio or a normalized energy value (SIR) for the second resultant multi-frame. This normalized energy or signal-to-noise ratio may be used as the second multi-frame energy metric $EM\_RSN_{N,2}$.

The second multi-frame energy metric $EM\_RSN_{N,2}$ and associated word $WORD\_RSN_{N,2}$ may be output to the DTX detection block 465.

Referring still to FIG. 6, at a multi-frame correlation block $426\_RSN_{N,3}$ it is assumed that the current frame N has an RSN value of 3. In this case, a set of correlations and noise energy for each of current frame N, previous frame N−1, previous frame N−2 and previous frame N−3 may be taken into account when determining a third multi-frame energy metric $EM_{N,3}$ and corresponding E-DPCCH word $WORD\_RSN_{N,3}$. In this case, the third multi-frame energy metric $EM\_RSN_{N,3}$ and the corresponding E-DPCCH word $WORD\_RSN_{N,3}$ may represent a possible energy metric and corresponding E-DPPCH word for the current frame N considering the current frame N and 3 previous frames.

The multi-frame correlation block $426\_RSN_{N,3}$ may receive the first set of correlations and the noise energy $NE_N$ for the current frame N from the front-end processing block 415. The multi-frame correlation block $426\_RSN_{N,3}$ may retrieve the second set of correlations and noise energy $NE_{N-1}$ for the previous frame N−1, the third set of correlations and noise energy $NE_{N-2}$ for the previous frame N−2 and a fourth set of correlations ($CORR\_N-3_1$, $CORR\_N-3_2$, ..., $CORR\_N-3_k$) and noise energy $NE_{N-3}$ for the previous frames N−3 from the buffer 418.

The noise energies $NE_N$, $NE_{N-1}$, $NE_{N-2}$ and $NE_{N-3}$ may be combined in a manner similar to that shown in FIG. 7, to produce a third multi-frame noise energy $NE_{N,3}$ for the third resultant multi-frame. However, in this case four noise energies may be added. Here, the third resultant multi-frame may have a frame length four times that of the current frame N.

The multi-frame correlation block $426\_RSN_{N,3}$ may combine each correlation in the first set with corresponding correlations in the second, third and fourth sets of correlations to generate a set of third multi-frame correlations ($CORR\_N,3_1$, $CORR\_N,3_2$, ..., $CORR\_N,3_k$). That is, for example, each correlation in the first, second, third and fourth sets of correlations corresponding to the same codeword may be added to produce a set of third multi-frame correlations for a third resultant multi-frame. This combining may be similar to that as described above, except that four sets of correlations may be combined. The set of third multi-frame correlations may be output to the MD block $427\_RSN_{N,3}$.

The MD block $427\_RSN_{N,3}$ may select the highest multi-frame correlation $CORR\_N,3_{max}$ in the set of third multi-frame correlations. The codeword in the codebook associated with the highest multi-frame correlation $CORR\_N,3_{max}$ being a possible codeword transmitted by the transmitter 300. The highest multi-frame correlation $CORR\_N,3_{max}$ may be selected by comparing the multi-frame correlations in the set of third multi-frame correlations with one another. This highest multi-frame correlation $CORR\_N,3_{max}$ may be used as a third multi-frame decoding metric $DM\_RSN_{N,3}$.

After determining the highest multi-frame correlation $CORR\_N,3_{max}$ and associated codeword in the codebook, the MD block $427\_RSN_{N,3}$ may select the 10-bit word corresponding to the 30-bit codeword with the highest third multi-frame correlation. The selected 10-bit word may be used as the $WORD\_RSN_{N,3}$.

The MD block $427\_RSN_{N,3}$ may then generate the third multi-frame energy metric $EM\_RSN_{N,3}$ based on the third multi-frame decoding metric $DM\_RSN_{N,3}$. For example, MD block $427\_RSN_{N,3}$ may square the third multi-frame decoding metric $DM\_RSN_{N,3}$ to generate an energy value. The energy value may represent the signal energy for the E-DPCCH over the third resultant multi-frame (e.g., including frames N, N−1, N−2 and N−3). In other words, the energy value may represent the signal energy for the E-DPCCH over a frame interval four times the length of frame N. The MD block $427\_RSN_{N,3}$ may then divide the resultant signal energy for the third resultant multi-frame by the multi-frame noise energy $NE_{N,3}$ (e.g., the sum of the noise energies $NE_N$, $NE_{N-1}$, $NE_{N-2}$ and $NE_{N-3}$) to generate a signal-to-interference/noise ratio or normalized energy value (SIR) for the third resultant multi-frame. This normalized energy or signal-to-noise ratio may be used as the third multi-frame energy metric $EM\_RSN_{N,3}$.

The third multi-frame energy metric $EM\_RSN_{N,3}$ and associated word $WORD\_RSN_{N,3}$ may be output to the DTX detection block 465.

Although FIG. 6 has been described with regard to a maximum of three retransmissions (e.g., m=3), it will be understood that any suitable maximum number of retransmissions may be used. If the maximum number of transmissions is greater than three, the structure of FIG. 6 may include additional multi-frame correlation blocks (e.g., $426\_RSN_{N,4}$, $426\_RSN_{N,5}$, etc.) and additional MD blocks (e.g., $427\_RSN_{N,4}$, $427\_RSN_{N,5}$, etc.). In this case, additional multi-frame correlation sets may be calculated based on additional previous frames (e.g., previous frame N−4, N−5, etc.), in the same manner as described above.

The E-DPCCH DTX detection and word determination block (hereinafter referred to as the DTX detection block) 465 may receive four possible E-DPCCH words $WORD\_RSN_{N,0}$, $WORD\_RSN_{N,1}$, $WORD\_RSN_{N,2}$, $WORD\_RSN_{N,3}$, and respective energy metrics $EM\_RSN_{N,0}$, $EM\_RSN_{N,1}$, $EM\_RSN_{N,2}$ and $EM\_RSN_{N,3}$ because m=3 in this example. However, the DTX detection block 465 could receive more or less energy metrics and corresponding words for different values of m.

The DTX detection block 465 may examine the last acknowledgment signal (ACK) sent to a UE in the downlink to determine the validity of each of the energy metrics $EM\_RSN_{N,0}$, $EM\_RSN_{N,1}$, $EM\_RSN_{N,2}$ and $EM\_RSN_{N,3}$ and corresponding words $WORD\_RSN_{N,0}$, $WORD\_RSN_{N,1}$, $WORD\_RSN_{N,2}$, and $WORD\_RSN_{N,3}$.

For example, if the most recent transmitted ACK to the UE indicates that a transmission has been successfully recovered in the first previous frame N−1, then current frame N does not have an RSN value of 1, 2 or 3. In this case, the energy metrics $EM\_RSN_{N,1}$, $EM\_RSN_{N,2}$ and $EM\_RSN_{N,3}$ and corresponding words $WORD\_RSN_{N,1}$, $WORD\_RSN_{N,2}$, $WORD\_RSN_{N,3}$ are invalid. The words $WORD\_RSN_{N,1}$, $WORD\_RSN_{N,2}$, $WORD\_RSN_{N,3}$ may then be eliminated as possible E-DPCCH words transmitted by the UE. In this example, the energy metric $EM\_RSN_{N,0}$ may be used as a DTX decision metric.

The DTX detection block 465 may then determine if a control signal has been received on the E-DPCCH based on the decision metric and a threshold. That is, for example, for the current frame N, the DTX detection block 465 may compare the decision metric with a threshold to determine whether a control signal has been received on the E-DPCCH. If the decision metric is greater than, or equal to, the threshold, the DTX detection block 465 may determine that a control signal has been received on the E-DPCCH. On the other hand, if the decision metric is less than the threshold, the DTX detection block 465 may determine that a control signal has not been received (e.g., no control signal is present) on the E-DPCCH.

The DTX detection block 465 may then output a binary DTX indicator indicating whether a control signal has been received on the E-DPCCH. The binary DTX indicator may have a binary value '1' or '0'. For example, a binary value '1' may indicate to the E-DPDCH processing block 435 that a control signal has been received on the E-DPCCH and a binary value '0' may indicate to the E-DPDCH processing block 435 that a control signal has not been received on the E-DPCCH. If a control signal has been received on the E-DPCCH, the DTX detection block 465 also outputs the E-DPCCH word (e.g., $WORD\_RSN_{N,0}$, $WORD\_RSN_{N,1}$, $WORD\_RSN_{N,2}$, etc.) corresponding to the highest possible energy metric (e.g., $EM\_RSN_{N,0}$, $EM\_RSN_{N,1}$, $EM\_RSN_{N,2}$, etc.), for example, in parallel with the binary indicator.

If the E-DPDCH processing block 435 receives a binary DTX indicator indicating that a control signal has been received on the E-DPCCH, the E-DPDCH processing block 435 may assume that a data signal has been received over the same frame on the associated E-DPDCH. The E-DPDCH processing block 435 may then begin to process the associated E-DPDCH using the received E-DPCCH word. On the other hand, if the binary DTX indicator indicates that no control signal (e.g., only noise) has been received over the current frame on the E-DPCCH, the E-DPDCH processing block may discard the received signal.

In another example, if the most recent ACK to the user indicates that a transmission has been successfully recovered in the previous frame N−2, then the current frame N cannot have RSN values of 2 or 3. That is, previous frames N−2 and N−3 are not retransmissions of the same E-DTrCH data received in the current E-DPDCH frame. However, previous frame N−1 may be a retransmission of the same data as in frame N, and thus, the RSN for the current frame N may have a value of 0 or 1. In this case, the energy metrics $EM\_RSN_{N,2}$ and $EM\_RSN_{N,3}$ and corresponding words $WORD\_RSN_{N,2}$ and $WORD\_RSN_{N,3}$ are invalid, and words $WORD\_RSN_{N,2}$ and $WORD\_RSN_{N,3}$ may be eliminated as possible E-DPCCH words transmitted by the UE.

The energy metrics $EM\_RSN_{N,0}$ and $EM\_RSN_{N,1}$ corresponding to the words $WORD\_RSN_{N,0}$ and $WORD\_RSN_{N,1}$, respectively, may be used for DTX detection. For example, the larger energy metric may be chosen as the DTX decision metric, and the E-DPCCH word corresponding to the larger energy metric may be chosen as the E-DPCCH word to be output if the DTX detection block 465 detects that a control signal is present on the E-DPCCH. Whether a control channel signal is present in the current frame N may be determined using the DTX decision metric and a threshold in the same manner as discussed above.

If downlink sent an ACK to the user indicating that an E-DCH packet was successfully recovered in the previous frame N−3, the current frame N cannot have an RSN value of 3. That is, previous frame N−3 is not a retransmission of the same E-DTrCH data received in the current frame N. However, previous frames N−1 and N−2 may be retransmissions of the same data as in current frame N, and thus, the current frame N may have an RSN value of 0, 1 or 2. In this case, the energy metric $EM\_RSN_{N,3}$ and word $WORD\_RSN_{N,3}$ associated with an RSN value of 3 are invalid, and word $WORD\_RSN_{N,3}$ may be eliminated as a possible E-DPCCH words transmitted by the UE.

The energy metrics $EM\_RSN_{N,0}$, $EM\_RSN_{N,1}$, and $EM\_RSN_{N,2}$ corresponding to words $WORD\_RSN_{N,0}$, $WORD\_RSN_{N,1}$ and $WORD\_RSN_{N,2}$, respectively, may be used for DTX detection. For example, the largest energy metric may be chosen as the DTX decision metric, and the E-DPCCH word corresponding to the larger energy metric may be chosen as the E-DPCCH word to be output if the DTX detection block 465 detects that a control signal is present on the E-DPCCH. Whether a control channel signal is present in the current frame N may be determined using the DTX decision metric and the threshold in the same manner as described above.

If no ACK was sent on the downlink in the 4 most recent frames, the current frame N may have an RSN value of 0, 1, 2, or 3. Therefore, all words $WORD\_RSN_{N,0}$, $WORD\_RSN_{N,1}$, $WORD\_RSN_{N,2}$ nor $WORD\_RSN_{N,3}$ are valid and none of the words $WORD\_RSN_{N,0}$, $WORD\_RSN_{N,1}$, $WORD\_RSN_{N,2}$ nor $WORD\_RSN_{N,3}$ may be eliminated as possible E-DPCCH words transmitted by the UE. The energy metrics $EM\_RSN_{N,0}$, $EM\_RSN_{N,1}$, $EM\_RSN_{N,2}$, and $EM\_RSN_{N,3}$ corresponding to words $WORD\_RSN_{N,0}$, $WORD\_RSN_{N,1}$, $WORD\_RSN_{N,2}$, and $WORD\_RSN_{N,3}$ may be used for DTX detection. For example, the largest energy metric may be chosen as the DTX decision metric and the E-DPCCH word corresponding to the larger energy metric may be chosen as the E-DPCCH word to be output if the DTX detection block 465 detects that a control signal is present on the E-DPCCH. Whether a control channel signal is present in the current frame N may be determined using the DTX decision metric and the threshold in the same manner as described above.

In example embodiments of the present invention the threshold may be dependent upon and/or proportional to the number of codewords in the codebook. That is, the greater number of codewords in the codebook, the higher the threshold. For example, a threshold determined based on a codebook having 64 codewords may be greater than a threshold determined based on a codebook having 4 codewords. A threshold dependent upon and/or proportional to the number of codewords in the codebook may allow for the same probability of false alarm with increased codebook size.

As is well-known in the art, the transport format set size and/or number of transmissions for a transport channel packet transmitted on the E-DPDCH may be indicative of the codebook size (i.e., the number of codewords in the subset of codewords to be used in decoding a received signal). Thus, in example embodiments of the present invention, the smaller the transport format set size and/or maximum number of transmissions for a transport channel packet, the smaller the codebook size and, subsequently, the smaller the threshold. Accordingly, in example embodiments of the present invention, the threshold may also, or in the alternative, be determined based on a transport format set size and/or a maximum number of transmissions for a transport channel packet.

In example embodiments of the present invention, the threshold may be determined based on a false alarm probability. A false alarm may be when a codeword is detected, but no transmission by a UE has actually been transmitted to the Node-B. A false alarm probability may be determined, for example, empirically by a network operator based on system performance requirements. The false alarm probability may be specified by a network operator, for example, at an RNC and may be passed to NodeBs within the network. In example embodiments of the present invention, a NodeB may maintain a look-up table, which may be used to convert the false alarm probability to a corresponding threshold or threshold value.

One or more example embodiments of the present invention may improve E-DPCCH detection performance as the number of retransmissions increases. For example, compared with the first transmission, the N-th transmission may require about $10*\log_{10}(n)$ dB less power to achieve the same, or substantially the same, performance.

In example embodiments of the present invention, false alarm rate on the E-DPCCH DTX detection may be fixed regardless of the RSN values for the current frame. This may be achieved by setting the threshold used to compare with the normalized energy as a function of the E-DPCCH codebook size.

In UMTS Release 6 and 7 standards, the RSN may saturate. In this case, the CFN may indicate the transmission index of a current frame. The CFN is the connection frame number of a dedicated communication link between the UE and the NodeB. It has been used for legacy channels in, for example, UMTS Release 99, Release 4 and Release 5. It may have a value of 0-255 and is 8 bits long. However, example embodiments of the present invention may be applied to the CFN in the same manner as described above with regard to the TFI.

One or more example embodiments of the present invention provide a more power efficient UE, for example, by processing received signals on a multi-frame basis. One or more example embodiments of the present invention provide improved system performance, for example, for 3GPP Working Group (WG) 4 to set system performance requirements, reduced interference between users, increased cell capacity, increased data throughput, increased battery life and/or increase talk/surf time.

Example embodiments of the present invention being thus described, it will be obvious that the same may be varied in many ways. Such variations are not to be regarded as a departure from the invention, and all such modifications are intended to be included within the scope of the invention.

We claim:

1. A method of detecting a signal, comprising:
generating at least one multi-frame correlation set based on a correlation set for at least one previous frame and a correlation set for the current frame such that based on at least a portion of control data transmitted in the current frame and at least a portion of control data transmitted in the at least one previous frame being the same, the correlation set for the current frame and the correlation set for the at least one previous frame being determined at least partially based on the portion of the control data that is the same between the current control frame and the at least one previous control frame, wherein each correlation set includes a plurality of correlation values, and each correlation value indicates a likelihood that a codeword is present in a signal;
generating decoding metrics for a current frame of a control channel based on the at least one multi-frame correlation set; and
detecting whether a signal is present on the control channel based on the generated decoding metrics;
wherein in the generating at least one multi-frame correlation, a threshold value of retransmissions is used to determine a number of the at least one previous frame included in generating the at least one multi-frame correlation set.

2. The method of claim 1, wherein each correlation in the correlation set for the current frame and for the at least one previous frame represents the likelihood that a respective codeword among a plurality of codewords is present in a signal received on the control channel.

3. The method of claim 1, wherein the generating step generates the decoding metrics for a current frame of a control channel based on the correlation set and a noise energy for the current frame and the correlation set and a noise energy for the at least one previous frame.

4. The method of claim 1, wherein the generating the at least one multi-frame correlation set combines each correlation in the correlation set for the current frame with a corresponding correlation in the correlation set for the at least one previous frame to generate the at least one multi-frame correlation set.

5. The method of claim 4, wherein
the generating decoding metrics step further includes,
selecting a correlation in the correlation set for the current frame as a current frame decoding metric, and
selecting a correlation in the at least one multi-frame correlation set as at least one multi-frame decoding metric; and
the detecting step detects whether a signal is present on the control channel based on at least one of the current frame decoding metric and the at least one multi-frame decoding metric.

6. The method of claim 5, wherein the detecting step comprises:
calculating a current frame energy metric based on the current frame decoding metric;
calculating at least one multi-frame energy metric based on the at least one multi-frame decoding metric; and wherein
detecting whether a signal is present based on a threshold and at least one of the current frame energy metric and the at least one multi-frame energy metric.

7. The method of claim 6, wherein the calculating the current frame energy metric further comprises:
squaring a highest correlation in the correlation set for the current frame to generate a current frame energy value; and
normalizing the current frame energy value to generate the current frame energy metric.

8. The method of claim 7, wherein the normalized current frame energy value is generated based on the current frame energy value and a noise energy for a current frame.

9. The method of claim 6, wherein the calculating the multi-frame energy metric step further comprises:
squaring a highest correlation in each of the at least one multi-frame correlation set to generate at least one multi-frame energy value; and normalizing the at least one multi-frame energy value to generate the at least one multi-frame energy metric.

10. The method of claim 9, wherein the at least one normalized multi-frame energy value is generated based on the multi-frame energy value and noise energies for the at least one previous frame and the current frame.

11. The method of claim 6, wherein the detecting step further comprises:
determining a validity of the at least one multi-frame energy metric;
selecting one of the current frame energy metric and the at least one multi-frame energy metric as a decision metric if the at least one multi-frame energy metric is valid; and
detecting whether a signal is present on the control channel based on the decision metric and a threshold.

12. The method of claim 11, further comprising:
outputting a control channel word if the detecting step detects that a signal is present on the control channel.

13. The method of claim 12, wherein the control channel word is an enhanced control channel word.

14. The method of claim 11, wherein,
if the at least one multi-frame energy metric is valid, the detecting step detects whether a signal is present on the control channel based on the current frame energy metric and the at least one valid multi-frame energy metric.

15. The method of claim 11, wherein the threshold is dependent on a number of codewords in a plurality of codewords associated with the control channel.

16. The method of claim 11, wherein the threshold is dependent on a transport format set size associated with the frames received on the control channel.

17. The method of claim 11, wherein the threshold is determined based on a maximum number of transmissions for a transport channel packet.

18. The method of claim 11, wherein the detecting step detects that a control channel signal is present on the control channel if the decision metric is greater than or equal to the threshold.

19. The method of claim 1, further comprising:
generating an indicator indicative of whether the control channel signal is present on the control channel based on the detecting step; and
determining whether to process data received on a data channel associated with the control channel based on the generated indicator.

20. The method of claim 1, wherein the physical channel is an enhanced dedicated channel.

21. A method of detecting a signal, comprising:
generating at least one multiframe correlation set based on a correlation set for a current frame of a control channel and a correlation set for at least one previous frame of the control channel, the current frame being a retransmission of the control data in the at least one previous frame, and the correlation set for the current frame and the correlation set for the at least one previous frame are determined at least partially based on the re-transmitted control data, wherein each correlation set includes a plurality of correlation values, and each correlation value indicates a likelihood that a codeword is present in the signal; and
detecting whether the signal is present on the control channel based on the at least one multiframe correlation set;
wherein in generating the at least one multi-frame correlation, a threshold value of retransmissions is used to determine a number of the at least one previous frames on which the at least one multi-frame correlation set is based.

22. The method of claim 21, wherein the control data includes at least one of a format indicator and a happy bit indicator.

23. The method of claim 21, wherein the detecting step detects whether a signal is present on the control channel based on the correlation set and a noise energy for the current frame and the correlation set and a noise energy for the at least one previous frame.

* * * * *